(12) United States Patent
Lin et al.

(10) Patent No.: US 7,982,941 B2
(45) Date of Patent: Jul. 19, 2011

(54) COLOR DISPLAY DEVICES

(75) Inventors: Craig Lin, San Jose, CA (US); Robert A. Sprague, Saratoga, CA (US)

(73) Assignee: SiPix Imaging, Inc., Fremont, CA (US)

( * ) Notice: Subject to any disclaimer, the term of this patent is extended or adjusted under 35 U.S.C. 154(b) by 48 days.

(21) Appl. No.: 12/547,351

(22) Filed: Aug. 25, 2009

(65) Prior Publication Data
US 2010/0053728 A1    Mar. 4, 2010

Related U.S. Application Data

(60) Provisional application No. 61/144,863, filed on Jan. 15, 2009, provisional application No. 61/093,674, filed on Sep. 2, 2008.

(51) Int. Cl.
*G02B 26/00*    (2006.01)
(52) U.S. Cl. ........................................ 359/296
(58) Field of Classification Search ................. 345/107; 359/296
See application file for complete search history.

(56) References Cited

U.S. PATENT DOCUMENTS

| | | | |
|---|---|---|---|
| 6,930,818 B1 | 8/2005 | Liang et al. | |
| 7,046,228 B2 | 5/2006 | Liang et al. | |
| 7,283,119 B2 | 10/2007 | Kishi | |
| 7,365,732 B2 | 4/2008 | Matsuda et al. | |
| 7,417,787 B2 | 8/2008 | Chopra et al. | |
| 2009/0213452 A1 | 8/2009 | Lin et al. | |
| 2010/0165005 A1* | 7/2010 | Sprague | 345/690 |
| 2010/0165448 A1* | 7/2010 | Sprague | 359/296 |

FOREIGN PATENT DOCUMENTS

| WO | WO 01/67170 A1 | 9/2001 |
|---|---|---|
| WO | WO 2009/105385 A1 | 8/2009 |

OTHER PUBLICATIONS

International Search Report for PCT/US09/54939, mailed Oct. 20, 2009.

* cited by examiner

*Primary Examiner* — David N Spector
(74) *Attorney, Agent, or Firm* — Perkins Coie LLP

(57) ABSTRACT

The color display of the present invention involves a two particle system and is capable of displaying multiple colors with high quality black and white states. The color states are suitable for highlighting function. The color display does not require alignment between the electrodes and the display cells in which a display fluid is filled, which significantly reduces the complexity of the design and also lowers the manufacturing costs.

22 Claims, 24 Drawing Sheets

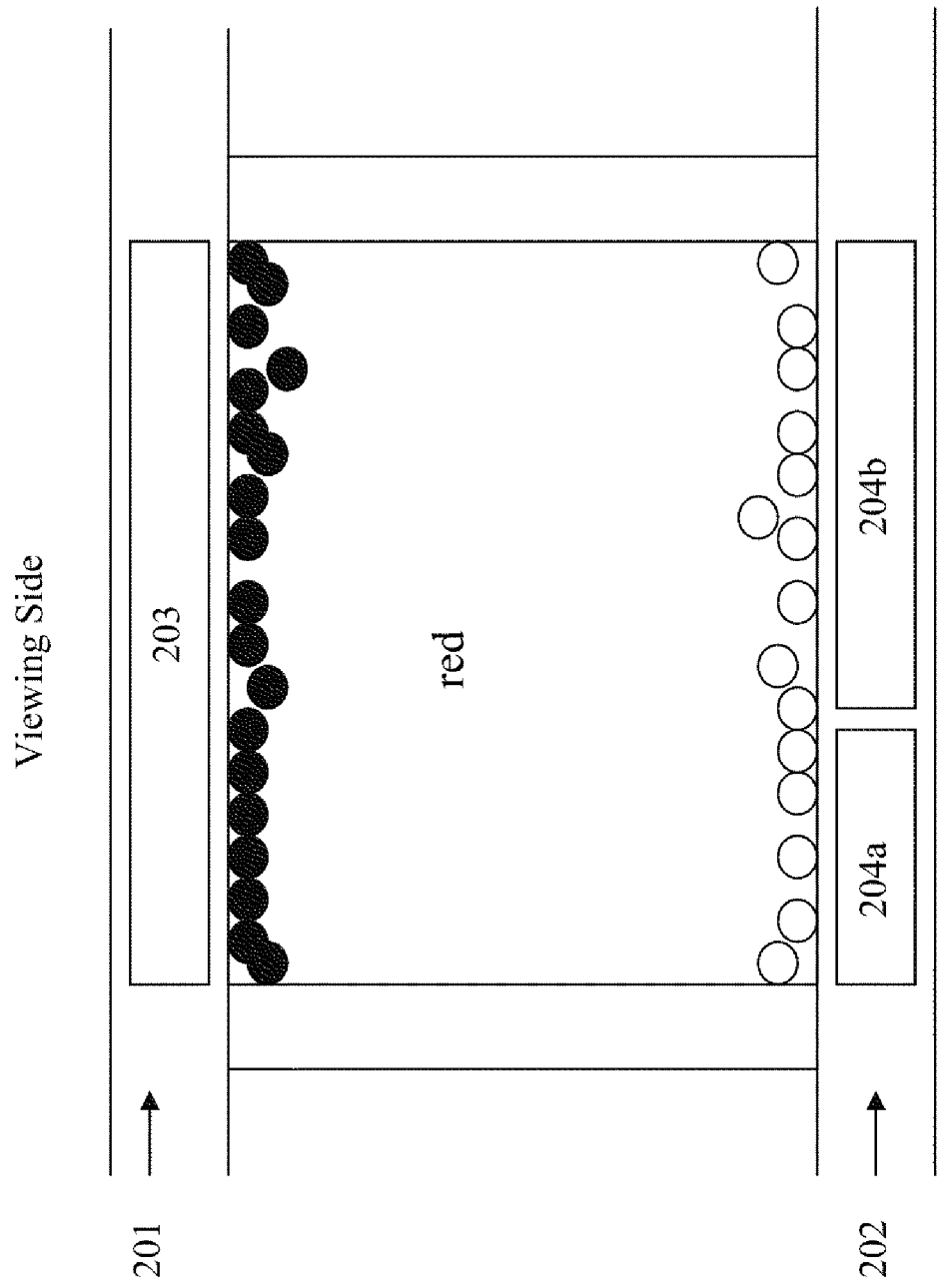

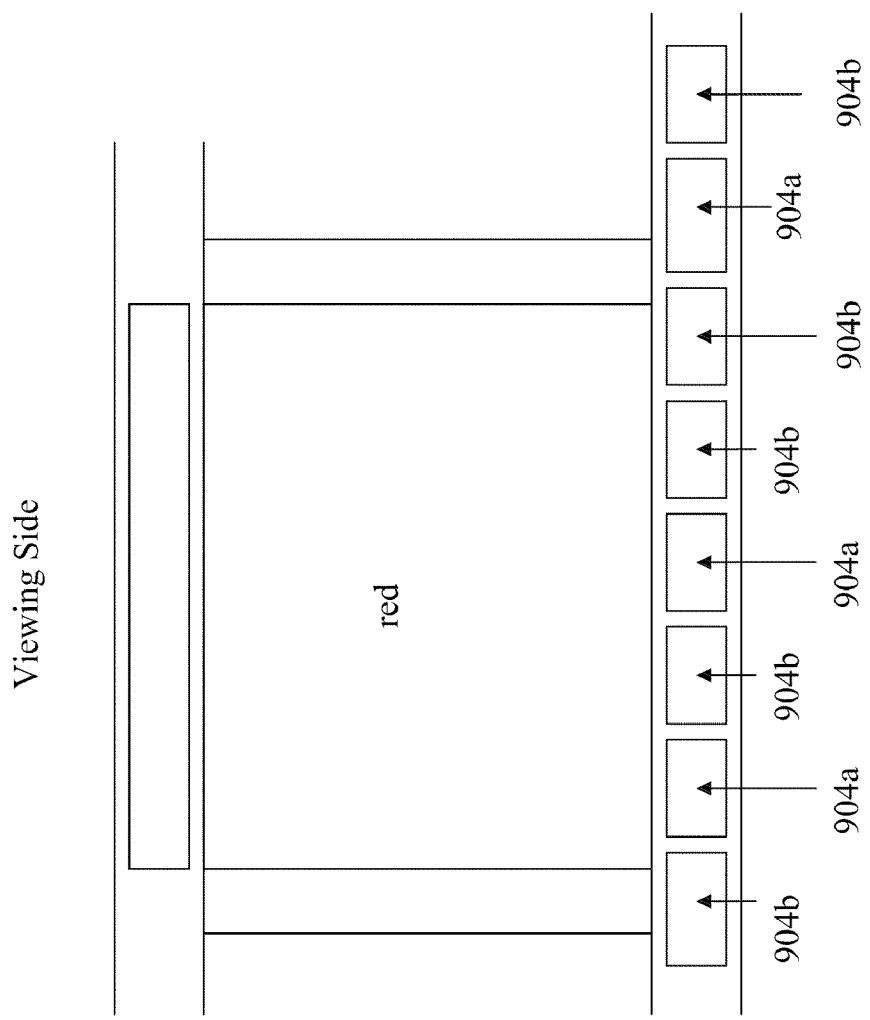

COLOR DISPLAY DEVICES

This application claims the benefit of U.S. Provisional Application Nos. 61/144,863, filed Jan. 15, 2009, and 61/093,674, filed Sep. 2, 2008, which are incorporated herein by reference in their entirety.

FIELD OF THE INVENTION

The present invention is directed to display devices which are capable of displaying multiple color states.

BACKGROUND OF THE INVENTION

U.S. Pat. No. 7,046,228 discloses an electrophoretic display device having a dual switching mode which allows the charged pigment particles in a display cell to move in either the vertical (up/down) direction or the planar (left/right) direction. In such a display device, each of the display cells is sandwiched between two layers, one of which comprises a transparent top electrode, whereas the other layer comprises a bottom electrode and at least one in-plane electrode. Typically, the display cells are filled with a clear, but colored dielectric solvent or solvent mixture with charged white pigment particles dispersed therein. The background color of the display cells may be black. When the charged pigment particles are driven to be at or near the transparent top electrode, the color of the particles is seen, from the top viewing side. When the charged pigment particles are driven to be at or near the bottom electrode, the color of the solvent is seen, from the top viewing side. When the charged pigment particles are driven to be at or near the in-plane electrode(s), the color of the display cell background is seen, from the top viewing side. Accordingly, each of the display cells is capable of displaying three color states, i.e., the color of the charged pigment particles, the color of the dielectric solvent or solvent mixture or the background color of the display cell. The dual mode electrophoretic display, according to the patent, may be driven by an active matrix system or by a passive matrix system.

U.S. application Ser. No. 12/370,485, filed Feb. 12, 2009, discloses a display device which utilizes a brightness enhancement film or black matrix layers to achieve an alternative color structure. By a post scanning method, the electrodes of the active matrix can be addressed. The enhancement film or black matrix layers can hide the charged pigment particles at the black state, without sacrificing the overall light efficiency.

SUMMARY OF THE INVENTION

The present invention is directed to alternative designs of color display devices.

A first aspect of the invention is directed to a display device which comprises
  a) a plurality of display cells wherein said display cells are filled with a display fluid comprising black and white pigment particles dispersed in a colored solvent wherein the color of the solvent is the same for all of the display cells and the black and white pigment particles carry opposite charge polarities;
  b) a first layer comprising a common electrode; and
  c) a second layer comprising a plurality of pairs of pixel electrodes wherein each pair of pixel electrodes defines a pixel.

In one embodiment, the pairs of pixel electrodes may be aligned with the display cells. In another embodiment, the pairs of pixel electrodes may be un-aligned with the display cells. In one embodiment, the distance between the midpoints of the partition walls surrounding a display cell is the same as the distance between the midpoint of a pixel electrode and the midpoint of the pixel electrode after the next pixel electrode. In one embodiment, the two pixel electrodes in a pair may be of different sizes or the same size. If they are of the different sizes, the ratio of the sizes of the two pixel electrodes may range from 10:1 to 2:1.

In one embodiment, one of the two pixel electrodes is an irregular-shaped pixel electrode. In another embodiment, both pixel electrodes are irregular-shaped pixel electrodes.

In one embodiment, the display device may have the first layer or the second layer as the viewing side.

In one embodiment, the pixel electrodes may be active matrix driving electrodes.

A second aspect of the invention is directed to a display device which comprises
  a) a plurality of display cells wherein said display cells are filled with display fluids of different colors, which display fluids of different colors comprise black and white pigment particles dispersed in solvents of different colors and the black and white pigment particles carry opposite charge polarities;
  b) a first layer comprising a common electrode; and
  c) a second layer comprising a plurality of pairs of pixel electrodes wherein each pair of pixel electrodes defines a sub-pixel and is aligned with a display cell.

In one embodiment, the pairs of pixel electrodes may be aligned with the display cells. In another embodiment, the pairs of pixel electrodes may be un-aligned with the display cells. In one embodiment, the distance between the midpoints of the partition walls surrounding a display cell is the same as the distance between the midpoint of a pixel electrode and the midpoint of the pixel electrode after the next pixel electrode.

In one embodiment, the two pixel electrodes in a pair may be of different sizes or the same size. If they are of the different sizes, the ratio of the sizes of the two pixel electrodes may range from 10:1 to 2:1.

In one embodiment of this aspect of the invention, one of the two pixel electrodes is an irregular-shaped pixel electrode. In another embodiment, both pixel electrodes are irregular-shaped pixel electrodes.

In one embodiment, the display device may have the first layer or the second layer as the viewing side.

In one embodiment, the pixel electrodes may be active matrix driving electrodes.

A third aspect of the present invention is directed to a display device which comprises
  a) a row of display cells which display cells are filled with a display fluid comprising black and white pigment particles dispersed in a colored solvent wherein the color of the solvent is the same for said display cells in said row and the black and white pigment particles carry opposite charge polarities;
  b) a first layer comprising a common electrode; and
  c) a second layer comprising a plurality of pairs of pixel electrodes wherein said pixel electrodes are not aligned with said display cells in the direction of said row.

The color display of the present invention involves a two particle system and is capable of displaying multiple colors with high quality black and white states. The color states are suitable for highlighting which is an important function for e-book applications. The color display does not require alignment between the electrodes and the display cells in which a display fluid is filled, which significantly reduces the complexity of the design and also lowers the manufacturing costs.

BRIEF DESCRIPTION OF THE DRAWINGS

FIGS. 2a-2d illustrate how different color states may be displayed by a color display of the present invention.

FIGS. 8a-8c show how different colors may be displayed by utilizing the irregular-shaped pixel electrodes of FIG. 7a.

FIGS. 10 and 11 show un-aligned designs with irregular-shaped pixel electrodes.

DETAILED DESCRIPTION OF THE INVENTION

Figures 1A, 1B:
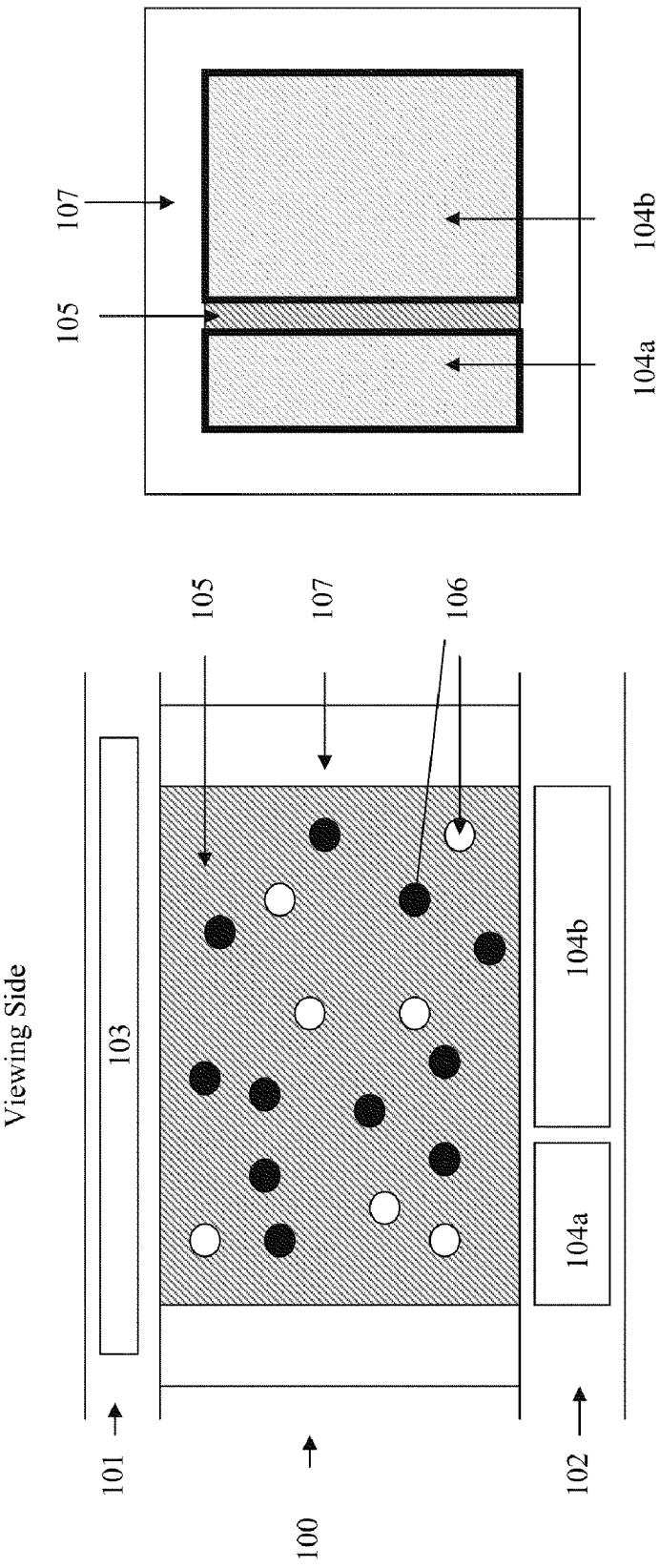
FIGS. 1a and 1b depict a cross-section view and a plane view, respectively, of a microcup of a color display device of the present invention.

FIG. 1a depicts a cross-section view of a color display device of the present invention. A microcup (100) is sandwiched between a first layer (101) and a second layer (102). The microcup (100) is surrounded by partition walls (107). The first layer comprises a common electrode (103). The second layer comprises a pair of pixel electrodes (104a and 104b).

The microcup (100) is a micro-container filled with a display fluid (105). Details of the term "microcup" are given in U.S. Pat. No. 6,930,818, the content of which is incorporated herein by reference in its entirety.

While microcups are specifically mentioned in the present application, it is understood that any other micro-containers (e.g., microcapsules or microchannels), regardless of their shapes or sizes, are within the scope of the present application, as long as the micro-containers are filled with a display fluid and have the same functions as the microcups. All such micro-containers may be referred to as "display cells".

The display fluid (105) is an electrophoretic fluid comprising two types of pigment particles (106), black and white carrying charges of opposite polarities. The display fluid is colored, e.g., red, green, blue or another color.

FIG. 1b depicts a plane view from the side of the second layer (102). In the embodiment as shown, the pair of pixel electrodes (104a and 104b) together cover substantially the entire display fluid area (105), but they do not cover any of the partition wall area (107).

The pair of pixel electrodes (104a and 104b) are shown as one larger pixel electrode (104b) and one smaller pixel electrode (104a). In the context of the present invention, the ratio of the sizes of the two pixel electrodes may range from 10:1 to 1:1. It is preferred that one pixel electrode is larger than the other (10:1 to 2:1 or 5:1 to 2:1). However, the color display would also work if the two pixel electrodes are of substantially the same size. The gap between the two pixel electrodes is in the micron range. However the two pixel electrodes cannot be too close to each other as that may cause short circuit. It is also noted that in some of the drawings, the gaps between the two pixel electrodes are exaggerated for clarity.

The pair of pixel electrodes in FIG. 1b are shown to have a rectangular shape. It is understood that the shapes of the pixel electrodes may vary, as long as they serve the desired functions.

Figure 1D:
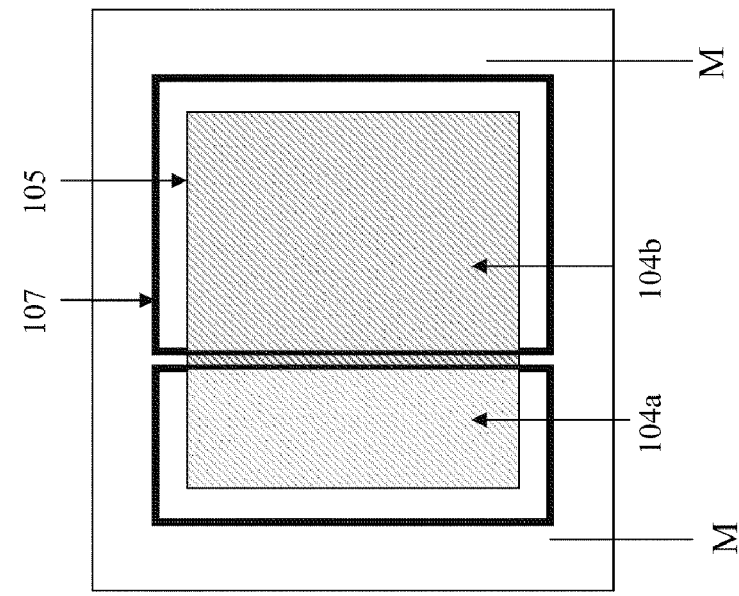
FIGS. 1c and 1d depict a cross-section view and a plane view, respectively, of an alternative design.
Figure 1C:
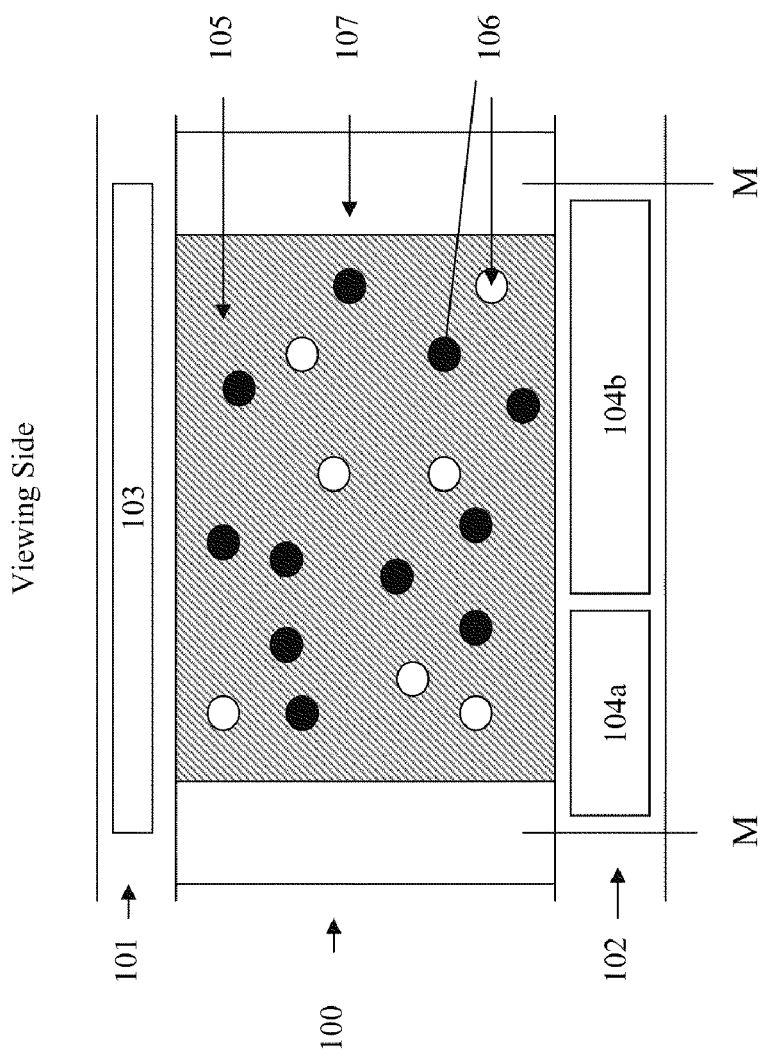

FIGS. 1c and 1d show another embodiment in which the two pixel electrodes extend beyond the display fluid area (105). However the edges of the two pixel electrodes (104a and 104b) do not go beyond the midpoint (M) of the partition walls (107).

The color displays of FIGS. 1a-1d are referred to as the aligned type as each pair of pixel electrodes are within the boundary of a microcup. More specifically, the two pixel electrodes do not exceed the midpoints of the partition walls surrounding a microcup. An unaligned type is discussed below.

The common electrode (103) is usually a transparent electrode layer (e.g., ITO), spreading over the entire top of the display device. The pixel electrodes (104a and 104b) are described in U.S. Pat. No. 7,046,228, the content of which is incorporated herein by reference in its entirety.

It is noted that while active matrix driving electrodes are mentioned for the second layer (102), the scope of the present invention encompasses other types of electrode addressing as long as the electrodes serve the desired functions.

While the first layer (101) is shown in most of drawings as the viewing side, it is also possible for the second layer (102) to be on the viewing side, which is discussed below.

The term "color" referred to in this application may be a single color, a mid-tone color or a composite color.

In one embodiment, the display fluid is of the same color in all microcups. Each pair of the pixel electrodes defines a pixel. FIGS. 2a-2d illustrate how different color states may be displayed in this embodiment. For the purpose of illustration, it is assumed that the display fluid is of a red color, the white pigment particles are positively charged and the black particles are negatively charged. The side of the first layer is the viewing side.

In FIG. 2a, when the common electrode (203) is applied a positive voltage and the two pixel electrodes (204a and 204b) are applied a negative voltage, the white particles would move to be near or at the two pixel electrodes while the black particles would move to be near or at the common electrode. As a result, a black color state is seen at the viewing side.

Figure 2B:
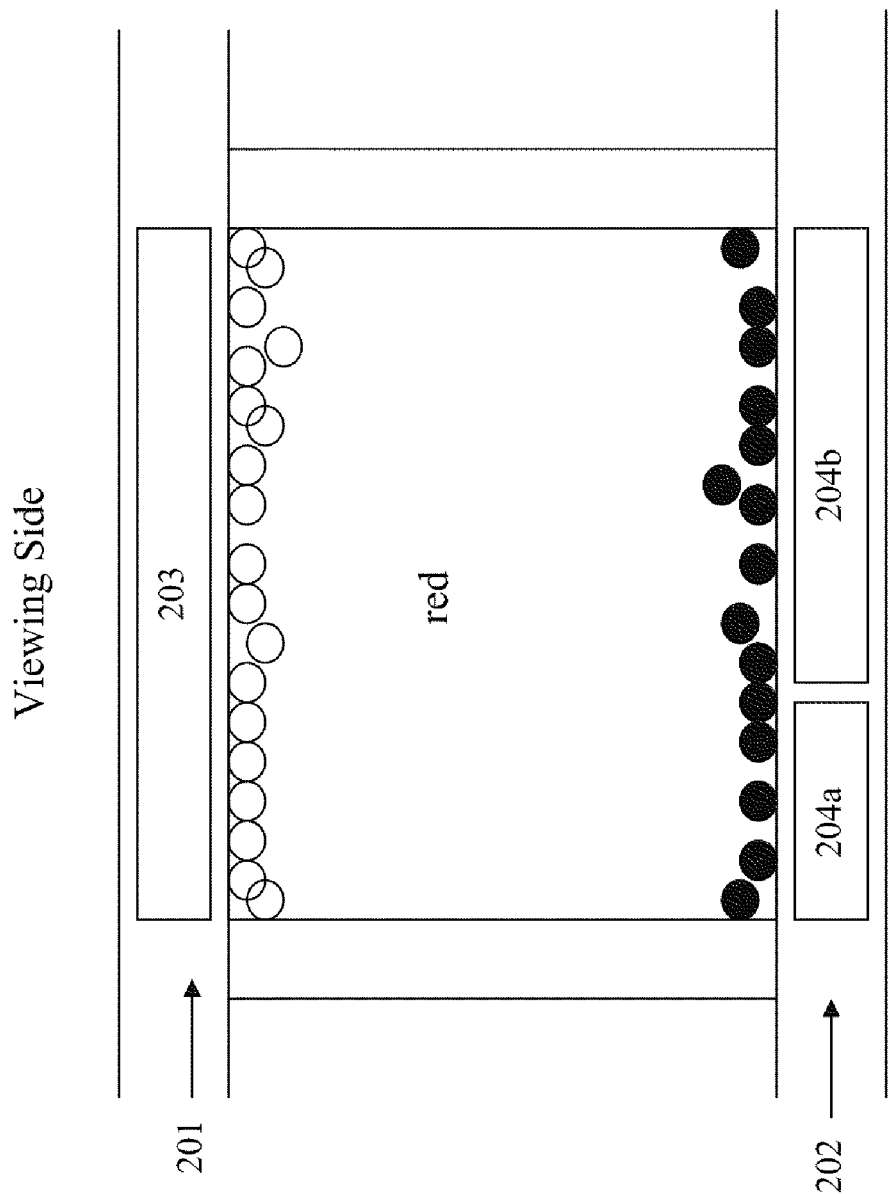

In FIG. 2b, when the common electrode (203) is applied a negative voltage and the two pixel electrodes (204a and 204b) are applied a positive voltage, the white particles would move to be near or at the common electrode while the black particles would move to be near or at the two pixel electrodes. As a result, a white color state is seen at the viewing side.

Both the black and white states utilize the full viewing area of a microcup for reflectivity and therefore provide a non-sacrificed black to white contrast ratio and the maximum reflectance.

Figure 2C:
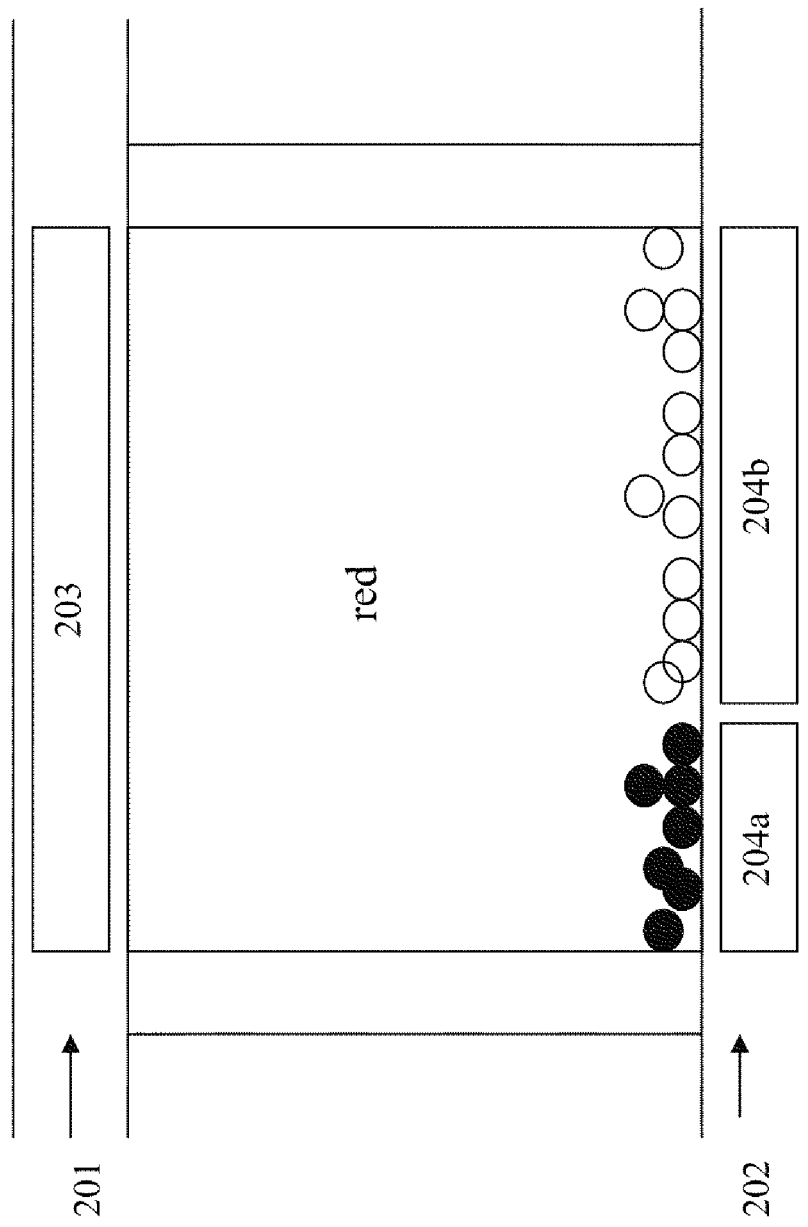

In FIG. 2c, when one of the pixel electrodes (204a and 204b), preferably the smaller one (204a), is applied a positive voltage and the larger pixel electrode (204b) is applied a negative voltage, the white particles would move to be near or at the larger pixel electrode (204b) while the black particles would move to be near or at the smaller pixel electrode (204a).

Figure 2D:
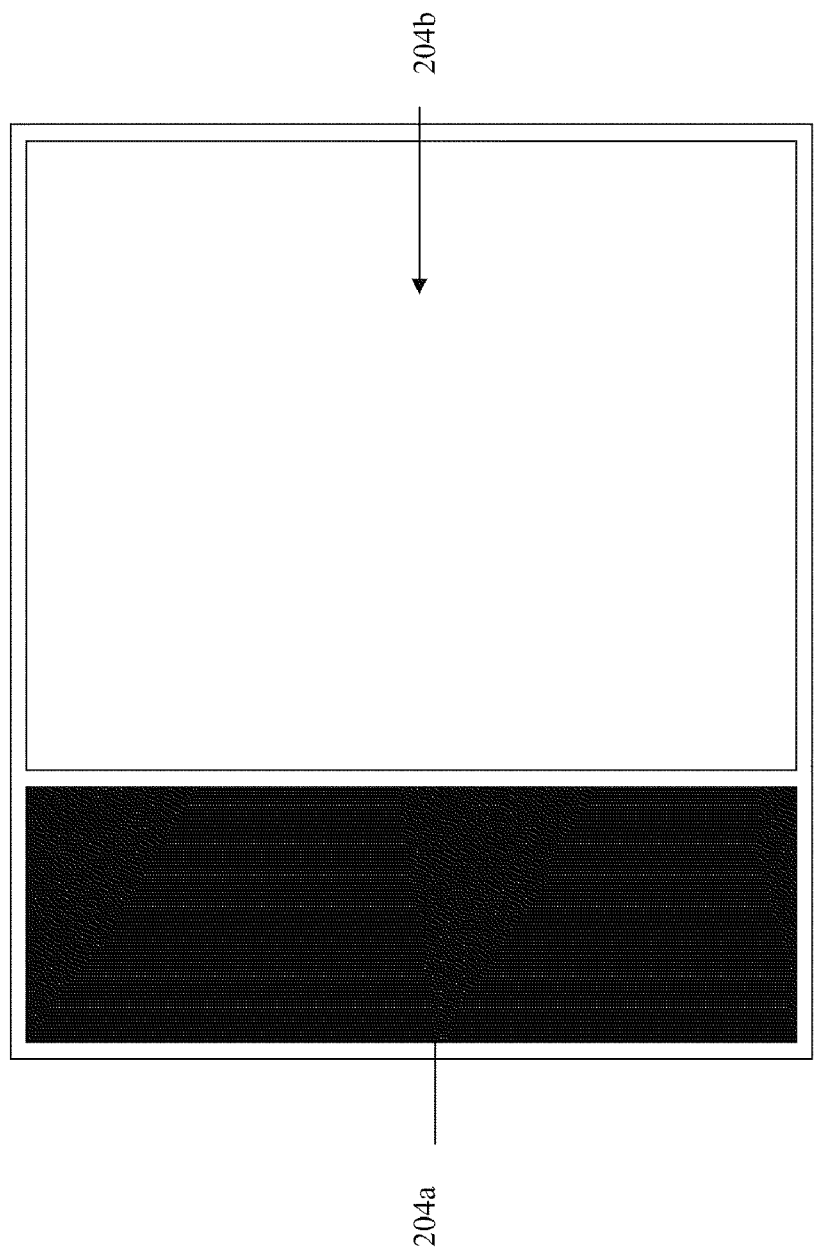

FIG. 2d is the top view of the second layer (202) having the white particles at the larger pixel electrode (204b) and the black particles at the smaller pixel electrode (204a). The light coming from the viewing side will be reflected by the white particles and the colored fluid will render the reflected light colored, red, in this case. However, the black particles will absorb the incoming light and therefore the effective colored reflectance area will be smaller than the area of only the black or white state.

In this embodiment, one of the unique features is that the display fluid comprises black and white particles dispersed in a colored solvent, thus causing simultaneous reflection (by the white particles) and absorption (by the black particles) of the color of the display fluid.

As stated above, in the color display as described the pair of pixel electrodes do not have to be aligned with the boundary of a microcup. In this case, the charged pigment particles may still be driven to show the desired color states.

The term "unaligned" or "non-aligned", in the context of this invention, is intended to mean that at least one of the pixel electrodes in a pair of pixel electrodes is permitted to be underneath more than one microcup.

Figure 3A:
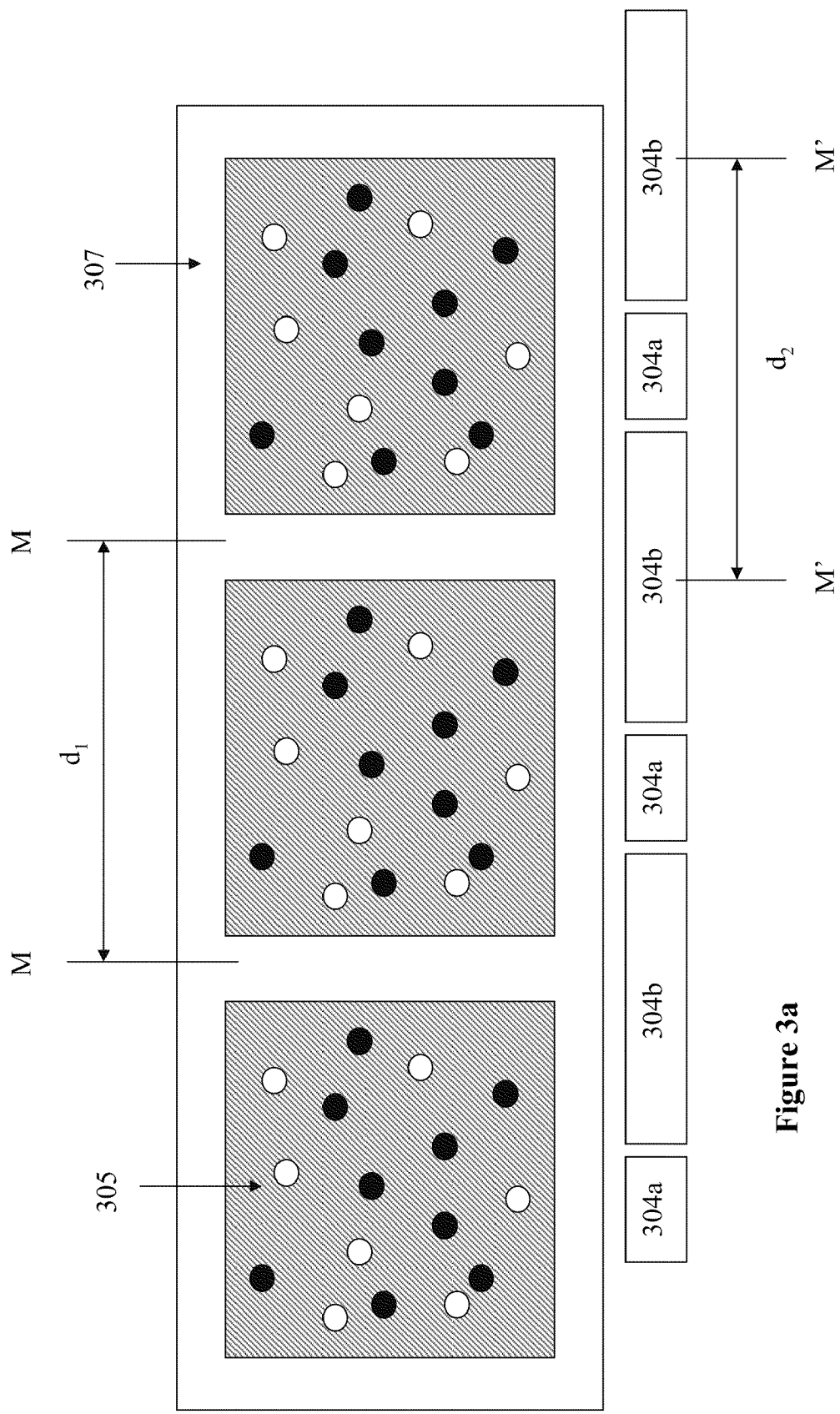
FIGS. 3a and 3b depict a cross-section view and a plane view, respectively, of an unaligned color display of the present invention.

In one embodiment of the non-aligned design as shown in FIG. 3a, the distance ($d_1$) between the midpoints (M) of the two closest partition walls is substantially the same as the distance ($d_2$) between the midpoints (M') of one pixel electrode and the next "like" pixel electrode. In FIG. 3a, the two like pixel electrodes are 304b. The two like pixel electrodes may also be 304a.

The midpoints M and M' are independent of each other, location wise.

Alternatively, it may be stated that the distance ($d_1$) between the midpoints (M) of the two closest partition walls is substantially the same as the distance ($d_2$) between the midpoints (M') of one pixel electrode and the pixel electrode after the next pixel electrode.

Figure 3B:
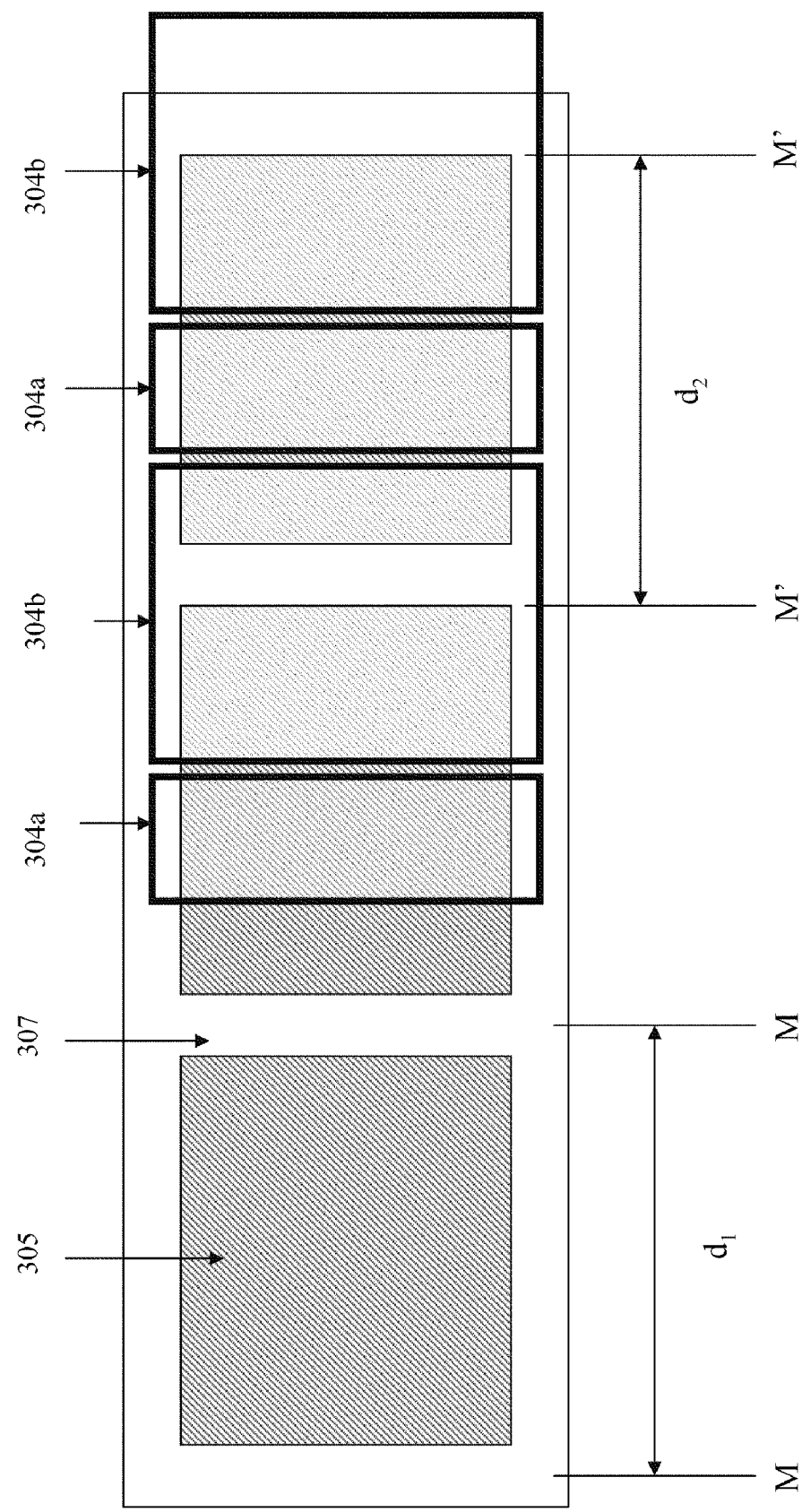
Figure 3C:
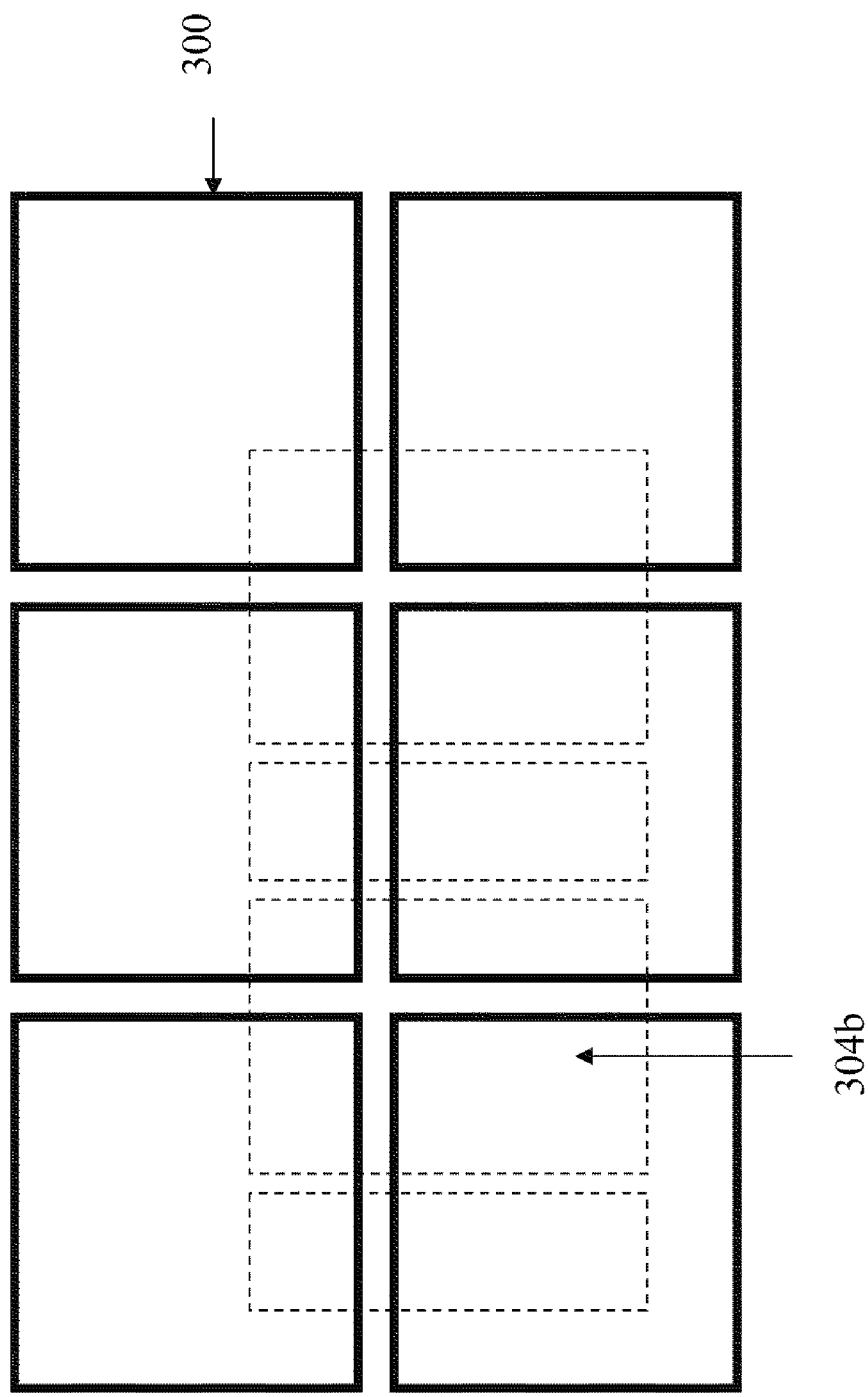
FIG. 3c depicts a plane view of an alternative un-aligned design.

FIG. 3b is a plane view from the second layer of FIG. 3a. In FIG. 3b, the microcups and the pixel electrodes are non-aligned in only one direction and in this case, one pixel electrode 304b is underneath two neighboring microcups. FIG. 3c is a plane view of another example of un-aligned design. In FIG. 3c, the microcups (300) and the pixel electrodes are non-aligned in both directions and in this case, one pixel electrode 304b is underneath four neighboring microcups. In the context of the present invention, the "un-aligned" or "non-aligned" design is not limited to the examples of FIGS. 3b and 3c. In fact, the term "un-aligned" or "non-aligned" would broadly encompass all configurations in which at least one pixel electrode is underneath more than one microcup. In other words, the "un-aligned" or "non-aligned" would also include configurations with microcups and/or pixel electrodes having irregular shapes, sizes or spatial arrangements.

In the non-aligned design, the width of a microcup does not have to be equal to the pitch of the pixel electrode structure.

Figure 4:
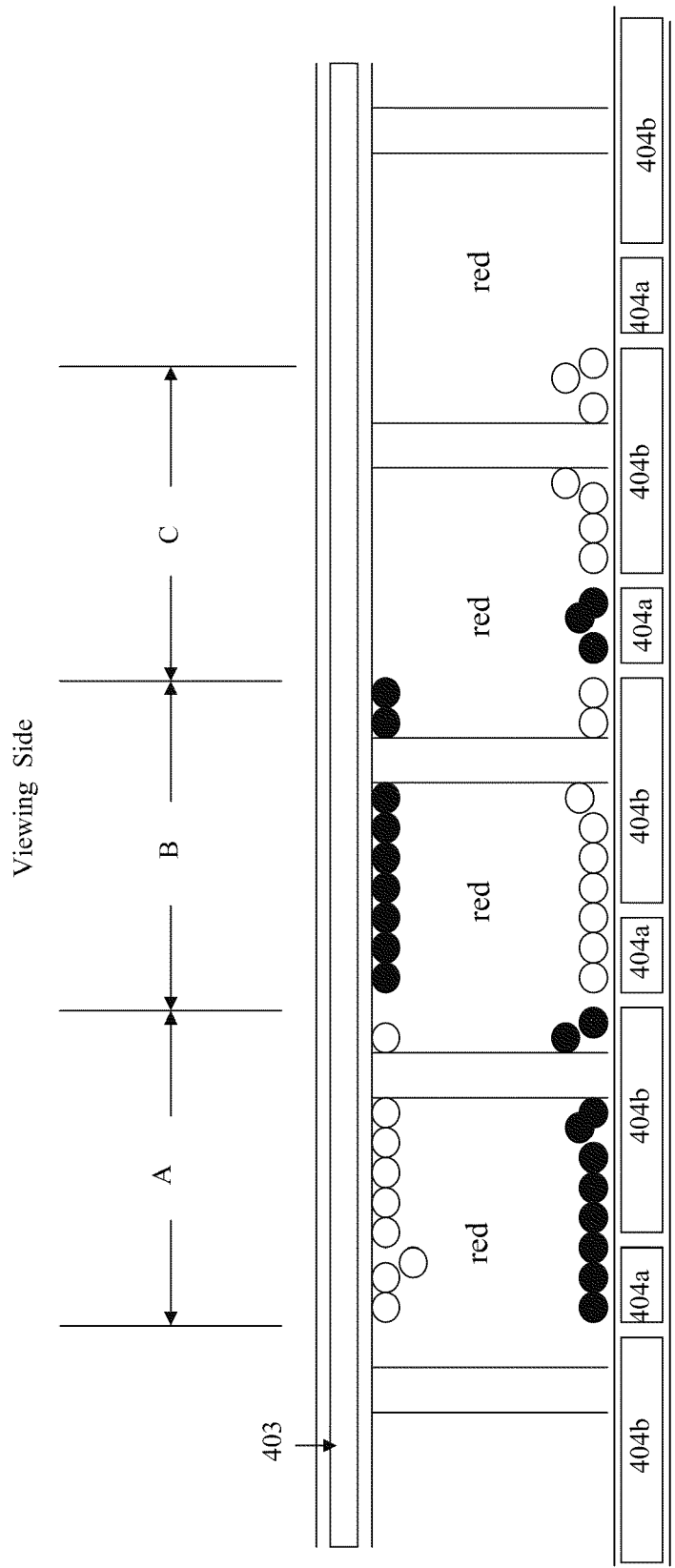
FIG. 4 depicts how different color states may be displayed by an un-aligned color display of the present invention.

FIG. 4 depicts a cross-section view of a non-aligned design. In this design, all of the microcups are filled with a display fluid of the same color (e.g., red). Each pair of the two pixel electrodes (404a and 404b) defines a pixel. By applying an appropriate driving waveform, the black and white particles may move to be near or at the common electrode (403), the smaller pixel electrodes (404a) or the large pixel electrodes (404b).

In FIG. 4, the display area corresponding to "A" is seen in the white color state; the display area corresponding to "B" is seen in the black color state; and the display area corresponding to "C" is seen in a red color state.

Figure 5A:
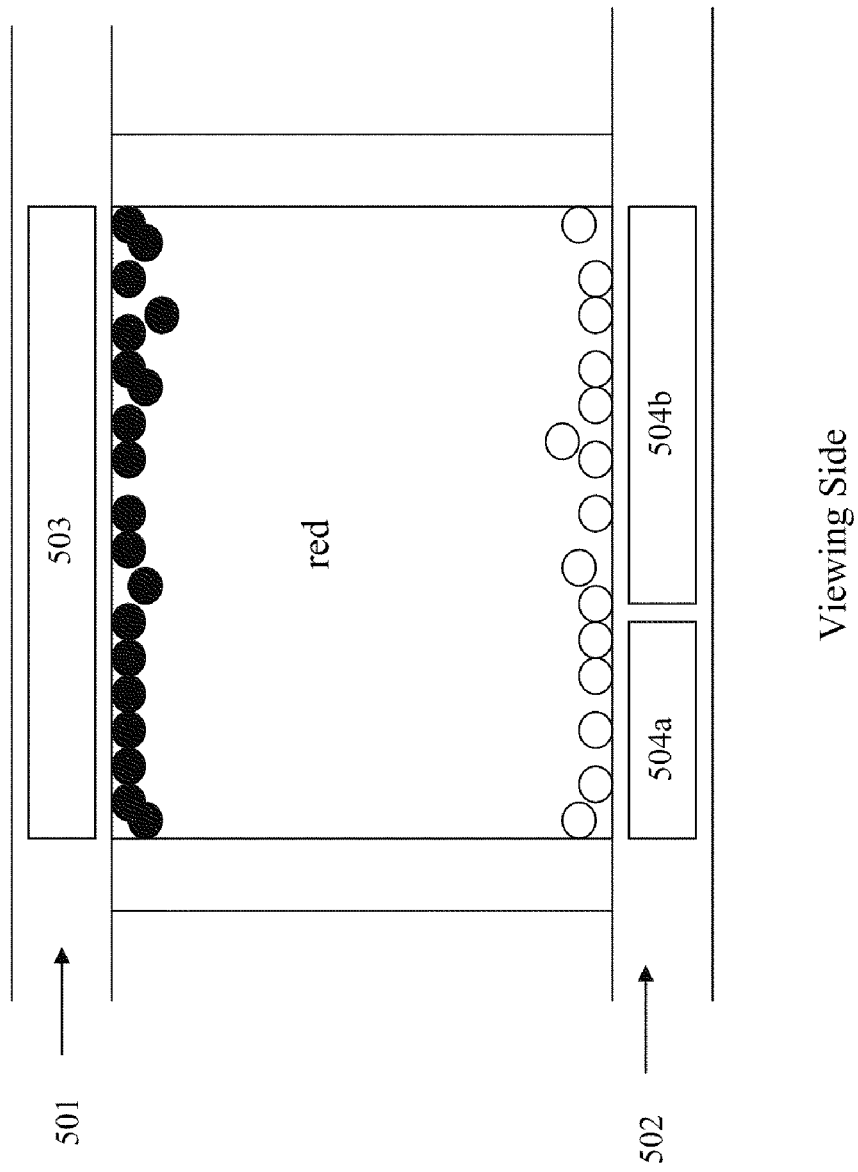
FIGS. 5a-5c depict an alternative design.
Figure 5B:
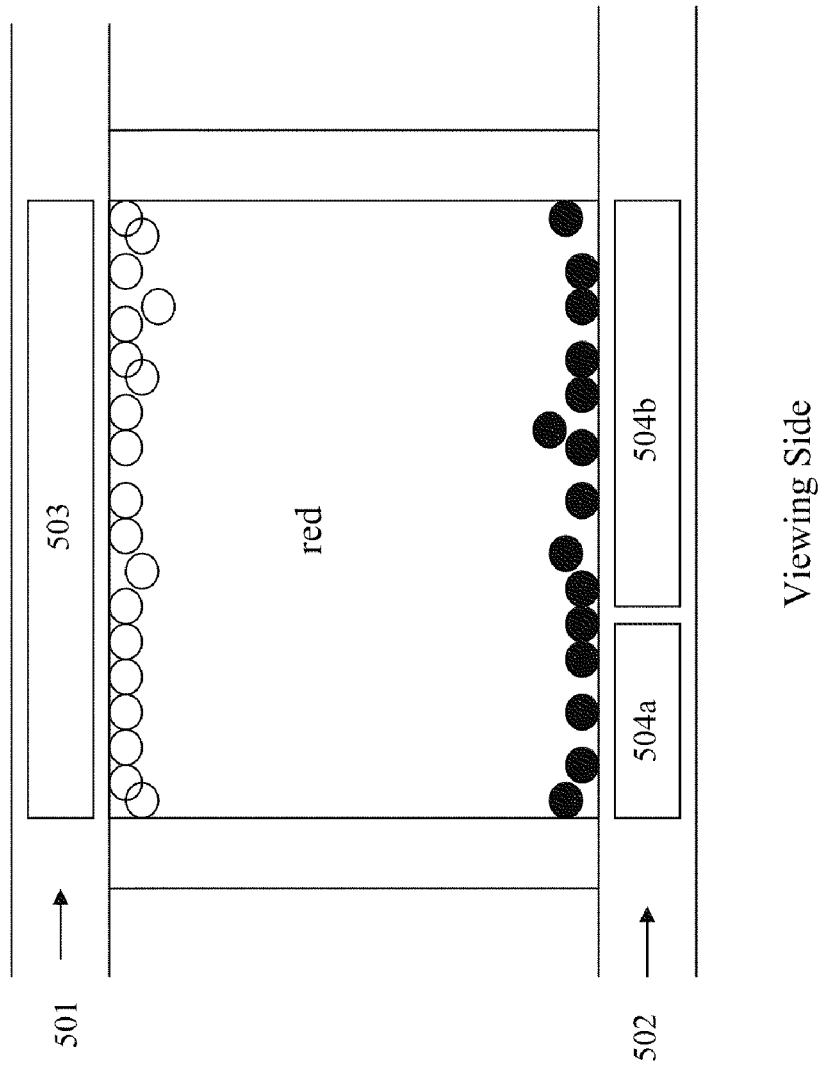
Figure 5C:
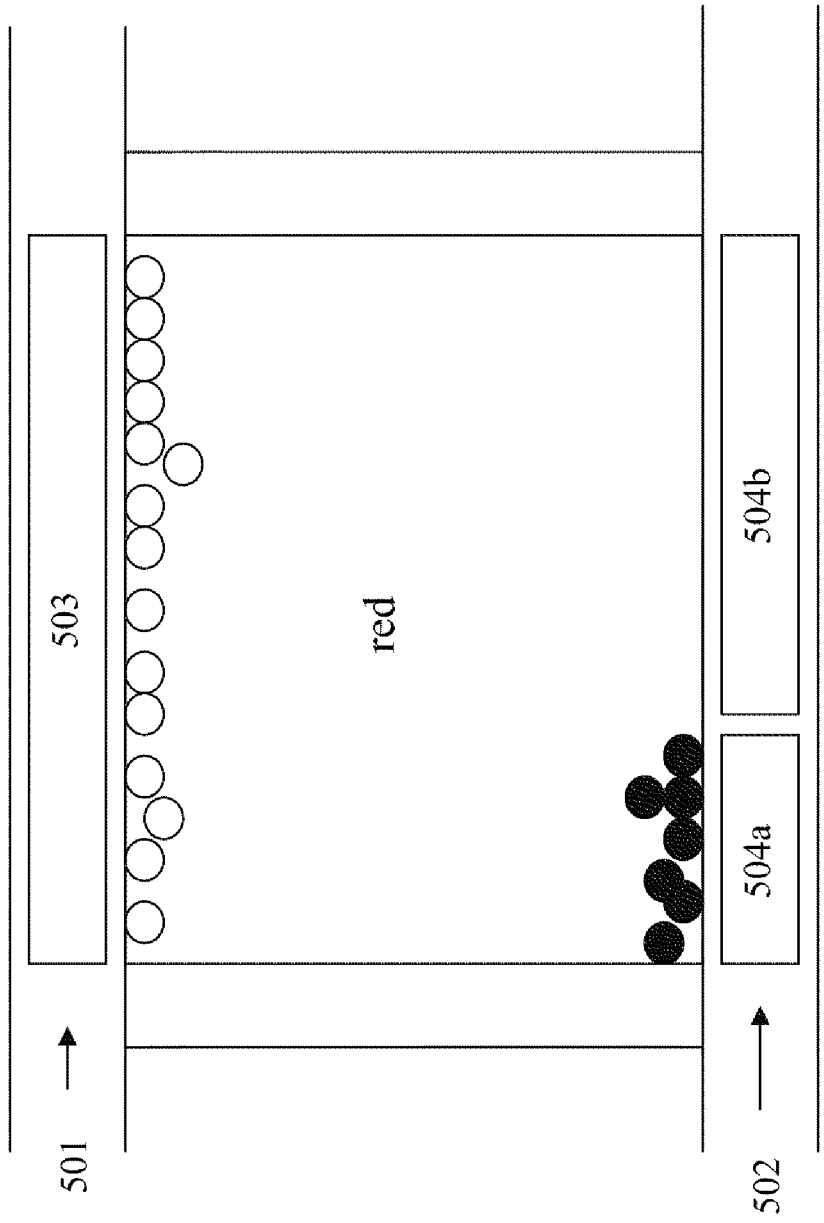

FIGS. 5a-5c show an alternative design of an aligned color display. In this design, the second layer 502 comprising two pixel electrodes 504a and 504b is the viewing side. In this case, the pixel electrodes 504a and 504b are transparent. The display fluid comprises black and white particles where the white particles are positively charged and the black particles are negatively charged. The display fluid is of a red color.

In FIG. 5a, when the common electrode (503) is applied a positive voltage and the two pixel electrodes (504a and 504b) are applied a negative voltage, the white particles would move to be near or at the two pixel electrodes while the black particles would move to be near or at the common electrode. As a result, a white color state is seen at the viewing side.

In FIG. 5b, when the common electrode (503) is applied a negative voltage and the two pixel electrodes (504a and 504b) are applied a positive voltage, the white particles would move to be near or at the common electrode while the black particles would move to be near or at the two pixel electrodes. As a result, a black color state is seen at the viewing side.

In FIG. 5c, when one of the pixel electrodes (504a and 504b), preferably the smaller one (504a), is applied a positive voltage and the common electrode (503) is applied a negative voltage, the white particles would move to be near or at the common electrode (503) while the black particles would move to be near or at the smaller pixel electrode (504a). As a result, a red color state is seen from the viewing side.

Figure 6:
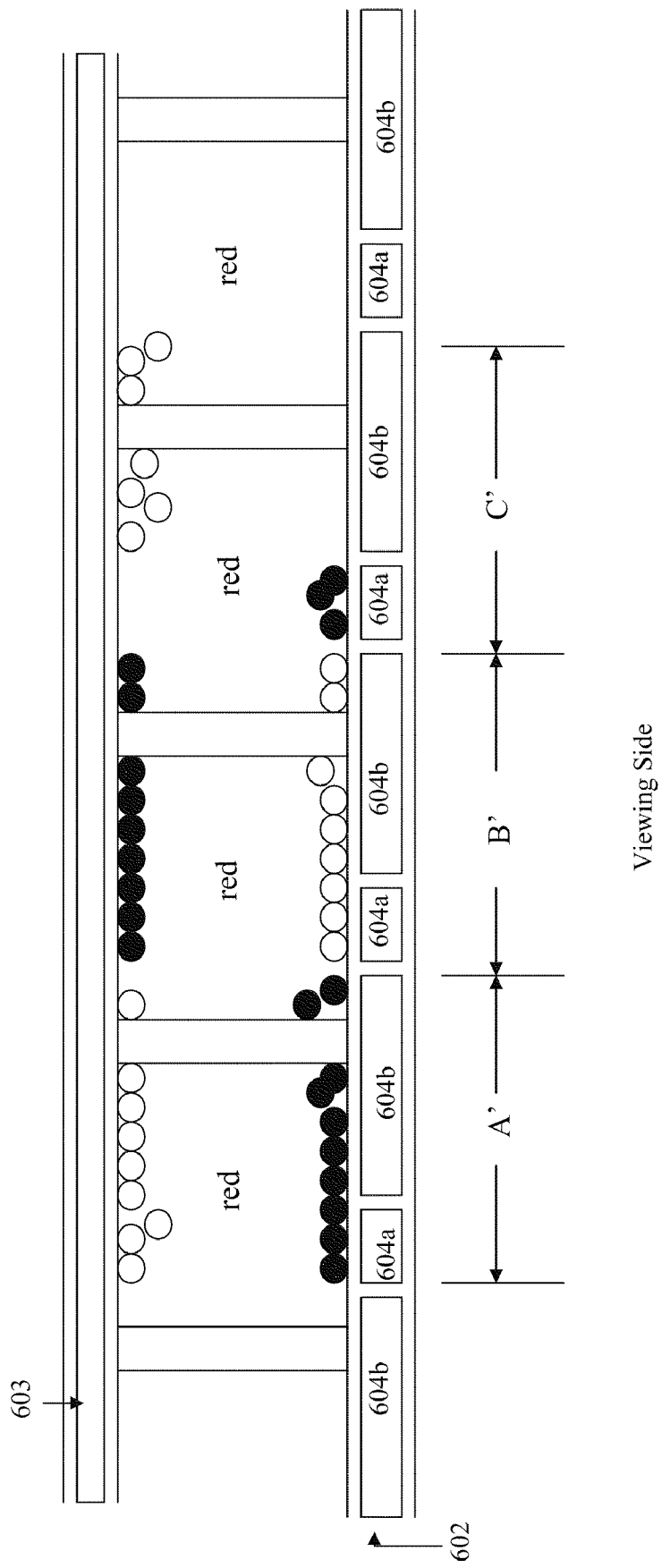
FIG. 6 depicts a further alternative design.

FIG. 6 is an alternative design of the un-aligned color display device.

In this design, the second layer (602) comprising pixel electrodes is the viewing side. By applying an appropriate driving waveform, the black and white particles may move to be near or at the common electrode (603), the larger pixel electrodes (604a) or the smaller pixel electrodes (604b).

In FIG. 6, the display area corresponding to "A'" is seen in the black color state; the display area corresponding to "B'" is seen in the white color state; and the display area corresponding to "C'" is seen in a red color state.

Figure 7B:
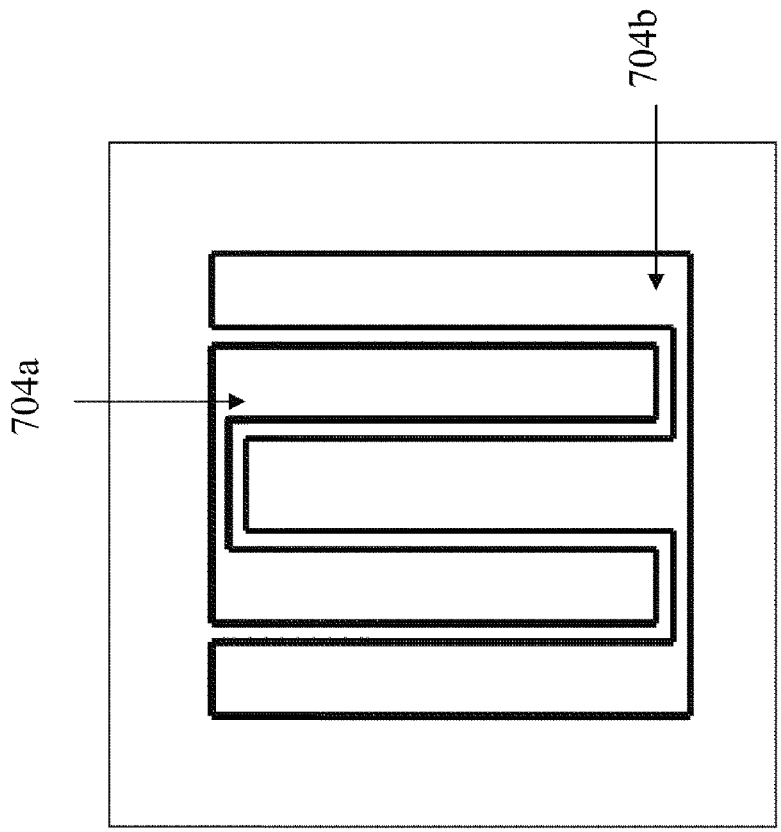
FIGS. 7a and 7b depict irregular-shaped pixel electrodes.
Figure 7A:
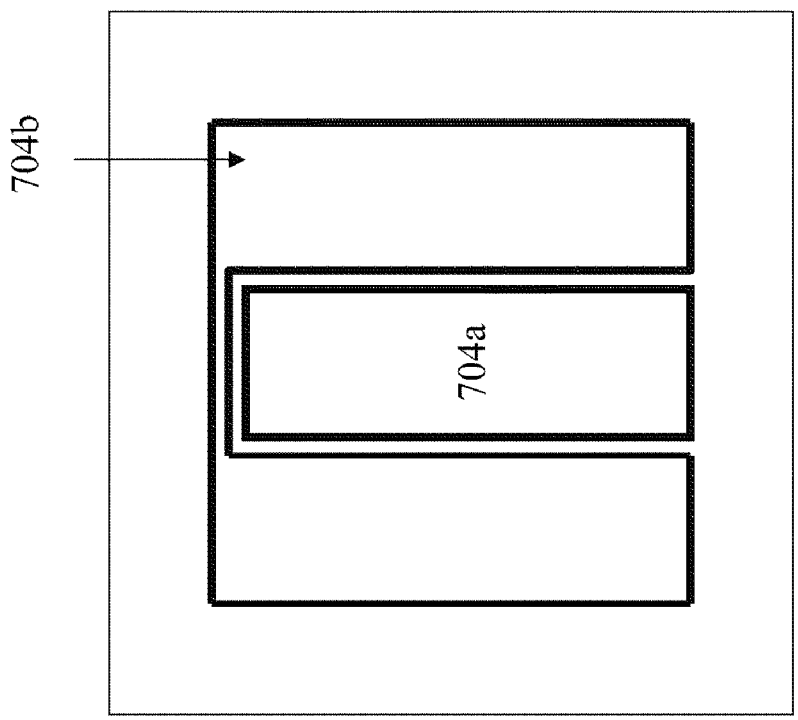

In a further embodiment of the present invention, the two pixel electrodes as shown in FIG. 1b may be configured differently in order to increase the speed of image transition. FIGS. 7a and 7b depict such alternative designs. In FIG. 7a, it is shown that the larger pixel electrode 704b is in the "U" shape. In FIG. 7b, it is shown that the larger electrode 704b is in the "W" shape while the smaller electrode 704a is in the "U" shape. The "U" or "W" shaped pixel electrode provides the benefit that the charged pigment particles would travel a shorter distance to the desired location, thus increasing the speed of image transition.

The term "irregular-shaped", in the context of the present invention, refers to a pixel electrode of any shape except rectangle or square, which can provide a shorter distance for the charged pigment particles to travel to a desired location. In the example given in FIG. 7a, the U shaped pixel electrode is in one piece (i.e., both physically and electrically connected). This also applies to the W shaped pixel electrode shown in FIG. 7b. However, the term "irregular-shaped" pixel electrode not only encompasses a pixel electrode which is in one piece (i.e., its elements are both physically and electrically connected), but also encompasses a pixel electrode which is divided into pieces (physically unconnected) but the pieces are electrically connected, as long as the overall shape of the pixel electrode will provide a shorter distance for the charged pigment particles to travel. In the latter case, it is noted that the separate pieces referred to can be of a rectangle, square or irregular shape.

The ratio of the total area of the larger irregular-shaped pixel electrode to the total area of the smaller irregular-shaped pixel electrode is still between the range of 10:1 to 1:1, preferably 10:1 to 2:1. Since the number of pixel electrodes remains to be the same (i.e., two), these new configurations would not increase the complexity of the driving system. In practice, they will cause the image transition to be much faster.

Figure 8A:
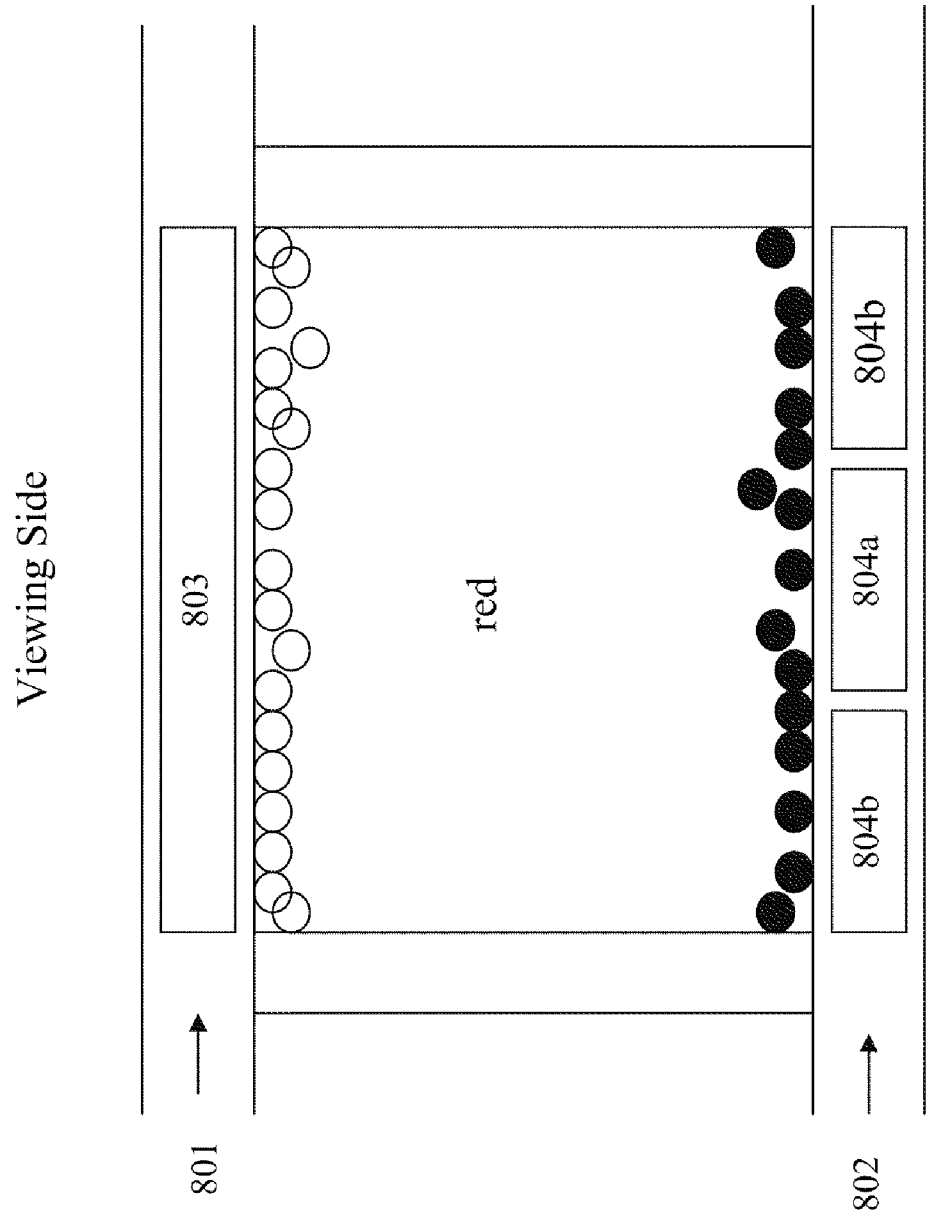
Figure 8B:
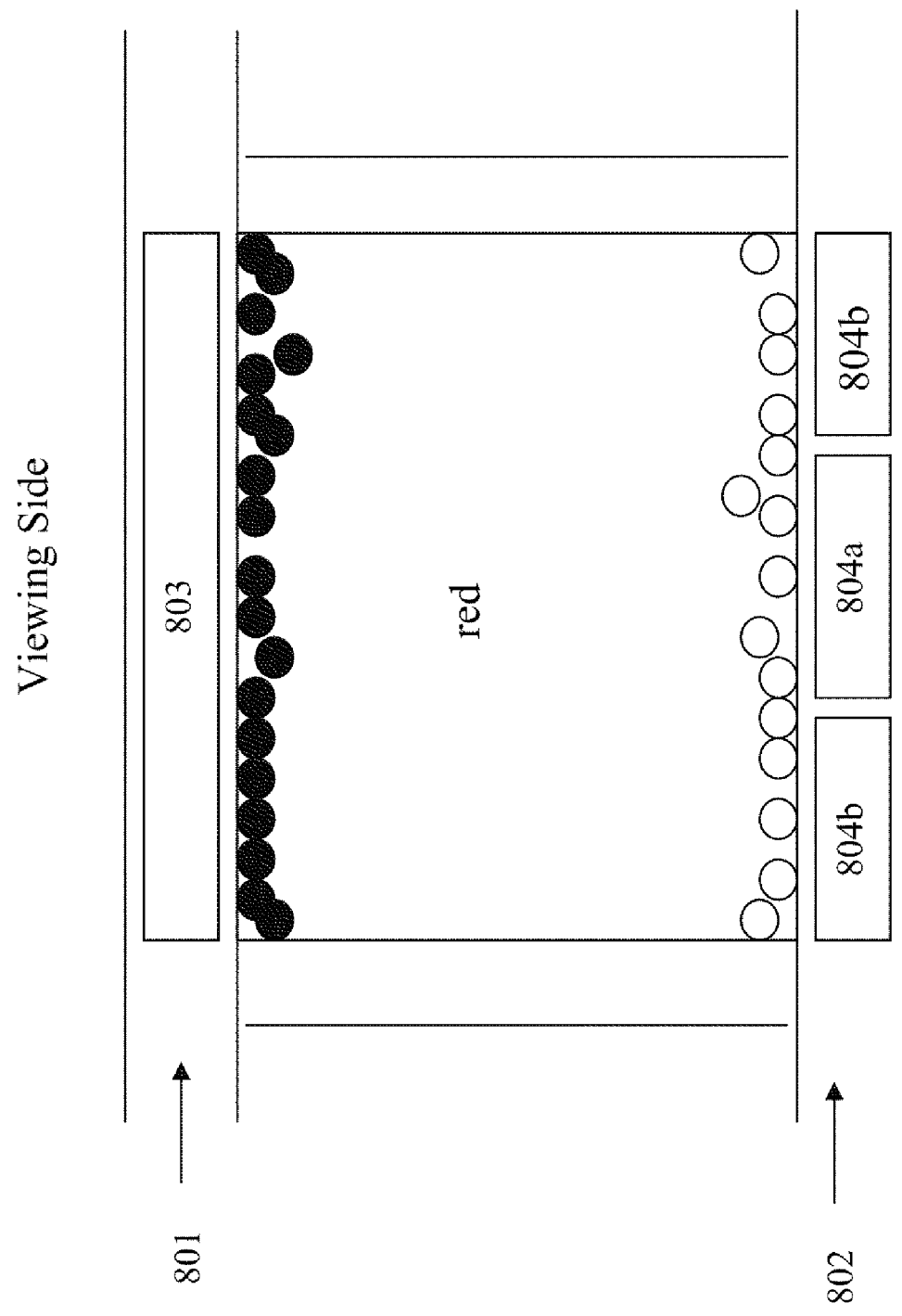
Figure 8C:
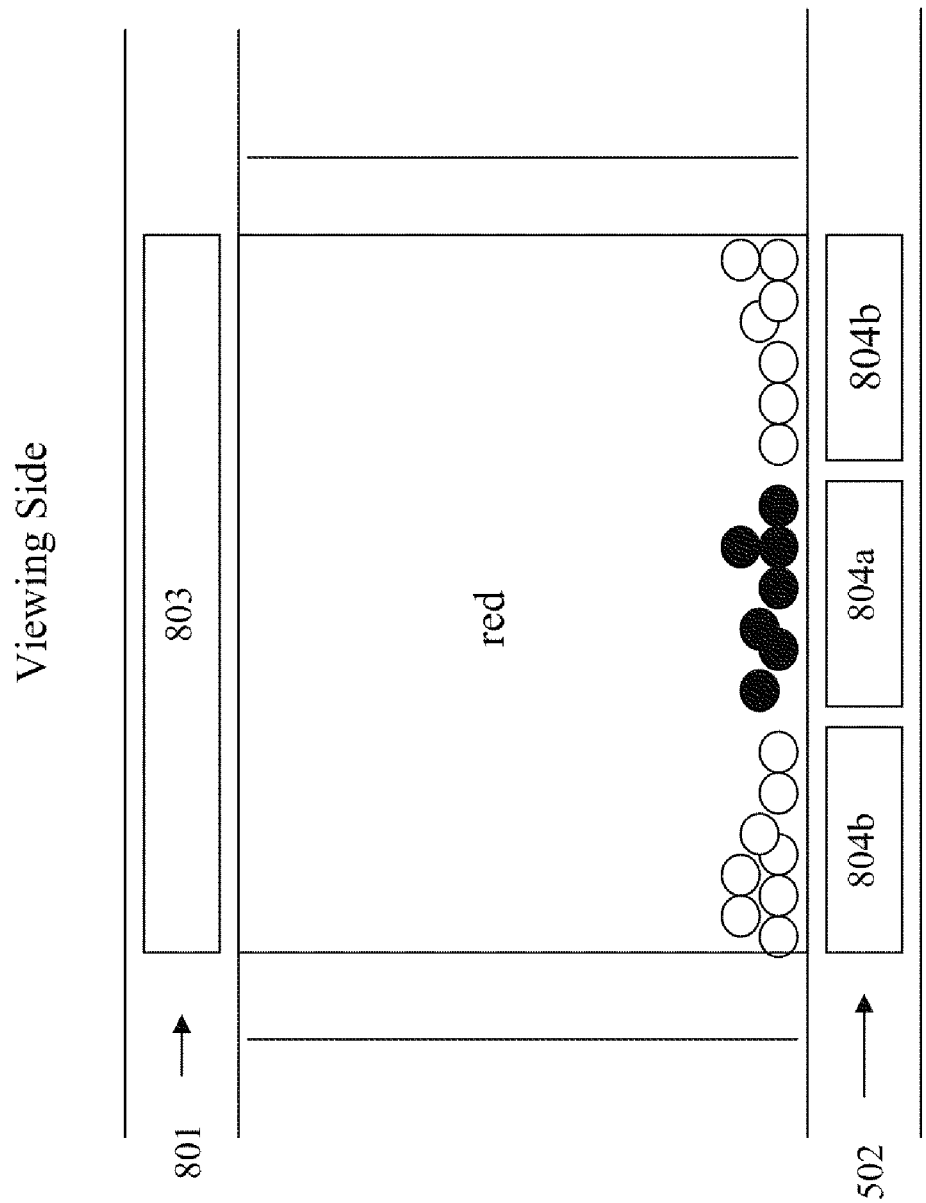

FIGS. 8a-8c show how different colors may be displayed utilizing the irregular-shaped pixel electrode design of FIG. 7a. In this example, it is assumed that the white and black particles are dispersed in a red color solvent and the white and black particles carry charges of opposite polarities.

In FIG. 8a, the white particles are driven to be at or near the common electrode 803 and the black particles are driven to be at or near the pixel electrode 804a and the irregular-shaped pixel electrode 804b (both left and right in the cross-section view), causing the white color to be seen at the top viewing side.

In FIG. 8b, the white particles are driven to be at or near the pixel electrode 804a and the irregular-shaped pixel electrode 804b (both left and right in the cross-section view) and the black particles are driven to be at or near the common electrode 803, causing the black color to be seen at the top viewing side.

In FIG. 8c, the white particles are driven to be at or near the irregular-shaped pixel electrode 804b (both left and right in the cross-section view) and the black particles are driven to be near or at the smaller pixel electrode 804a. Since the total area of the irregular-shaped pixel electrode 804b is larger than the pixel electrode 804a, the light reflected by the white particles would be dominant and as a result, the color of the display fluid (i.e., red in this case) is seen at the top viewing side.

Figure 9A:
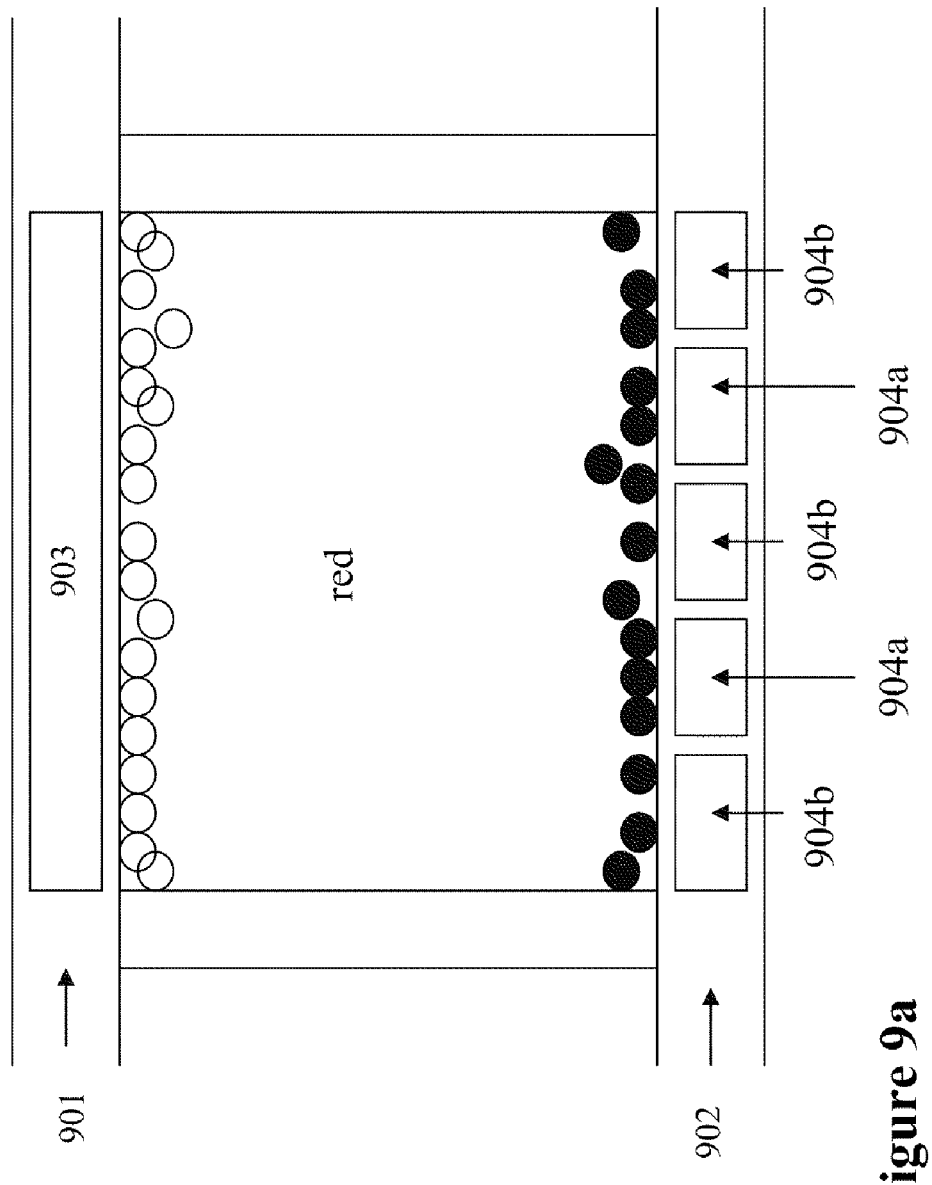
FIGS. 9a-9c show how different colors may be displayed by utilizing the irregular-shaped pixel electrodes of FIG. 7b.
Figure 9B:
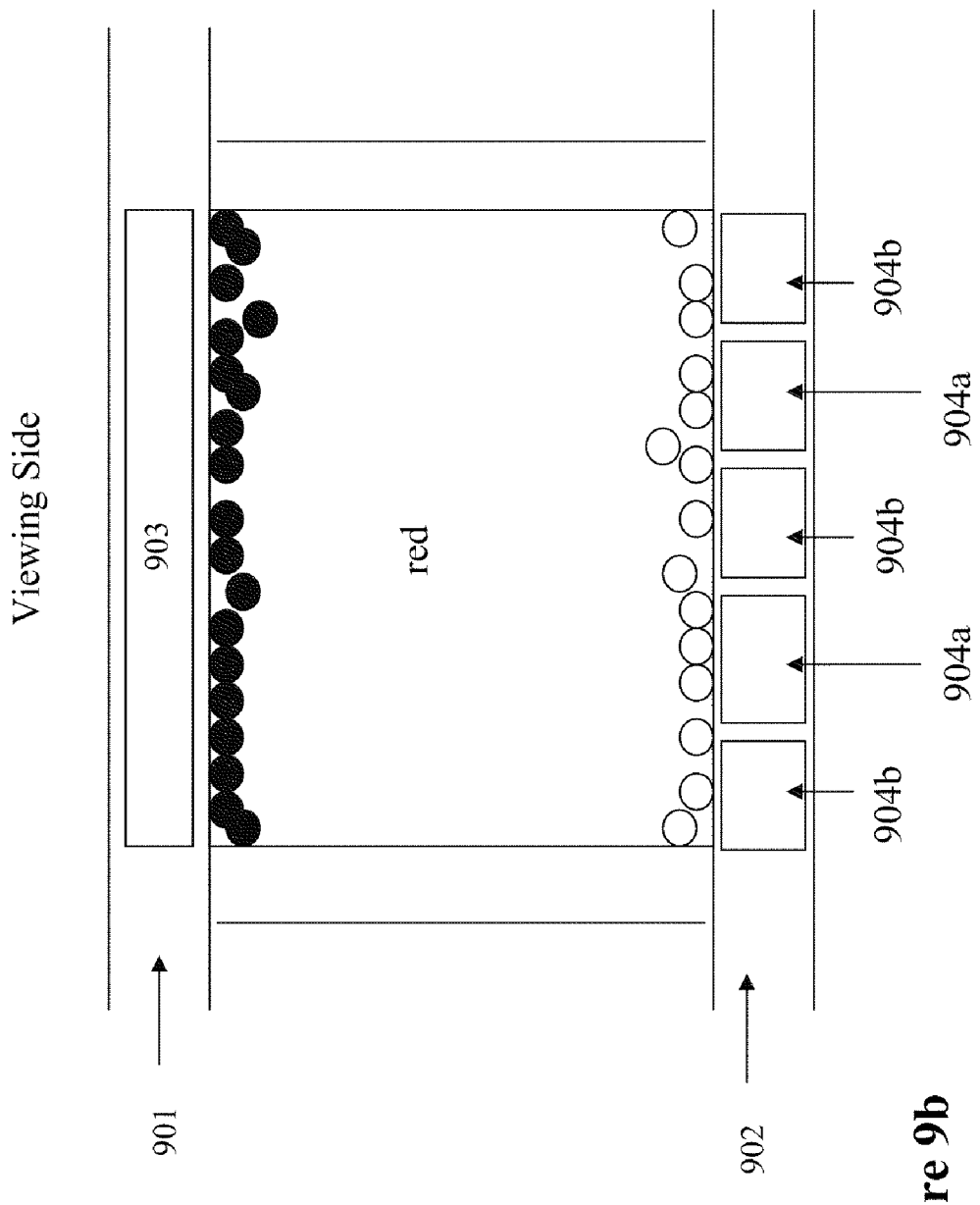
Figure 9C:
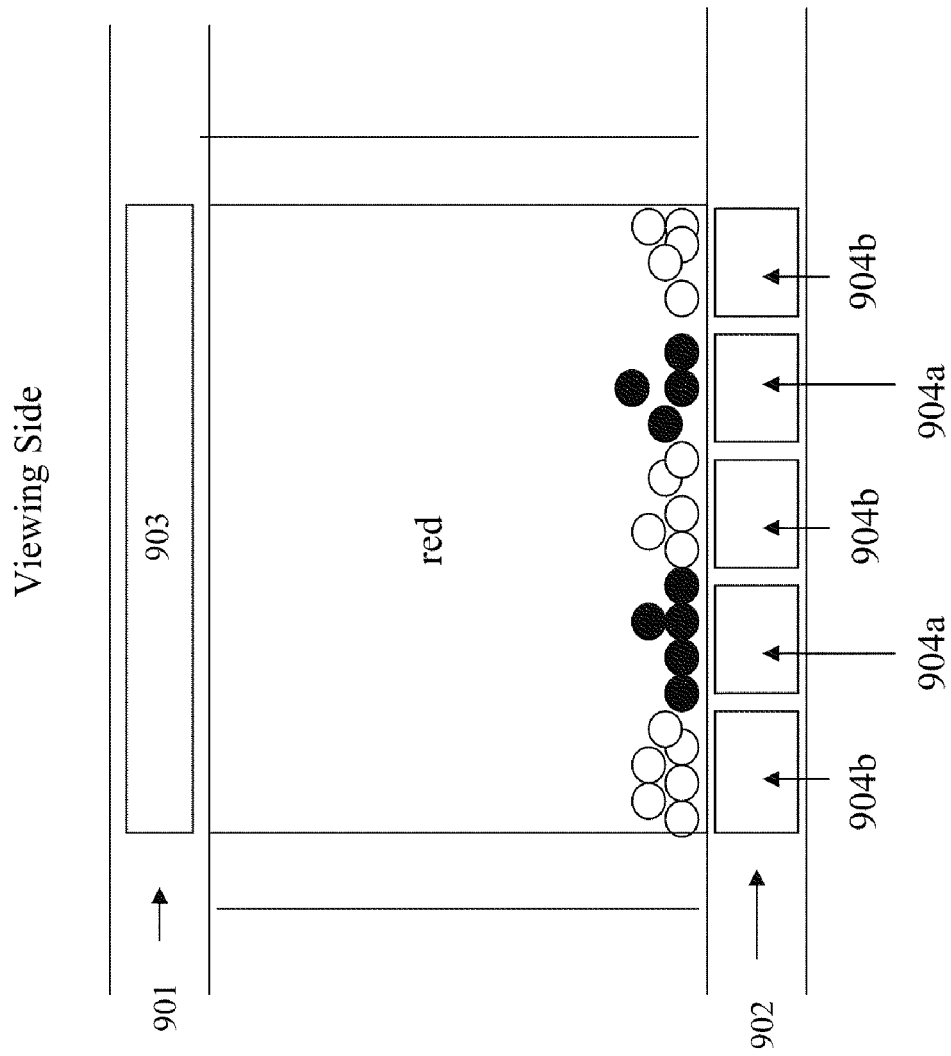

FIGS. 9a-9c show a display device utilizing the irregular shaped pixel electrode design of FIG. 7b. In this example, different color states (white, black and color) may be displayed in a similar manner as those in FIGS. 8a-8c.

Figure 10:
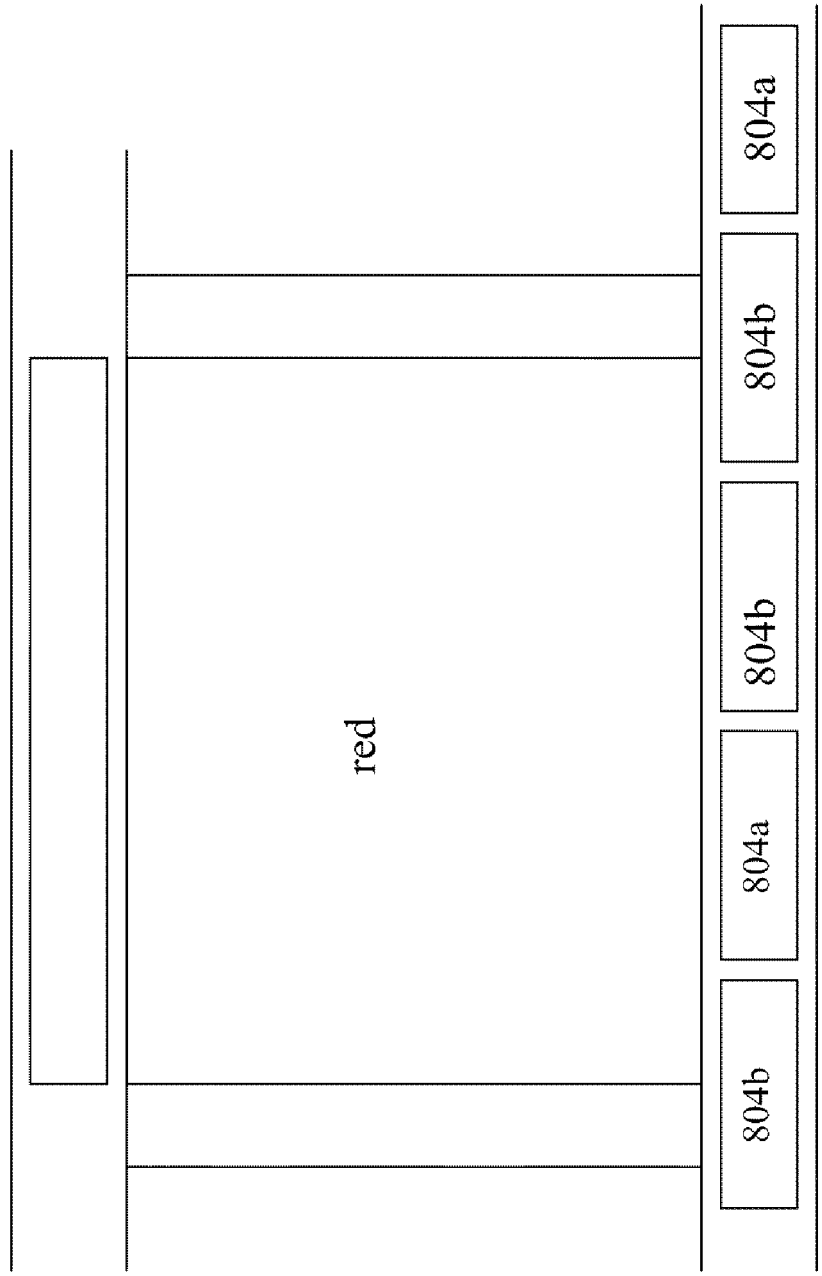

As with the previous embodiments, the irregular-shaped pixel electrode configurations may be aligned as shown in FIGS. 8 and 9 or un-aligned with a microcup structure, as shown in FIGS. 10 and 11.

As also with the previous embodiments, while an irregular-shaped pixel electrode design is used, the display device may be viewed from the side of the first layer or the side of the second layer.

Figures 12A, 12B, 12C:
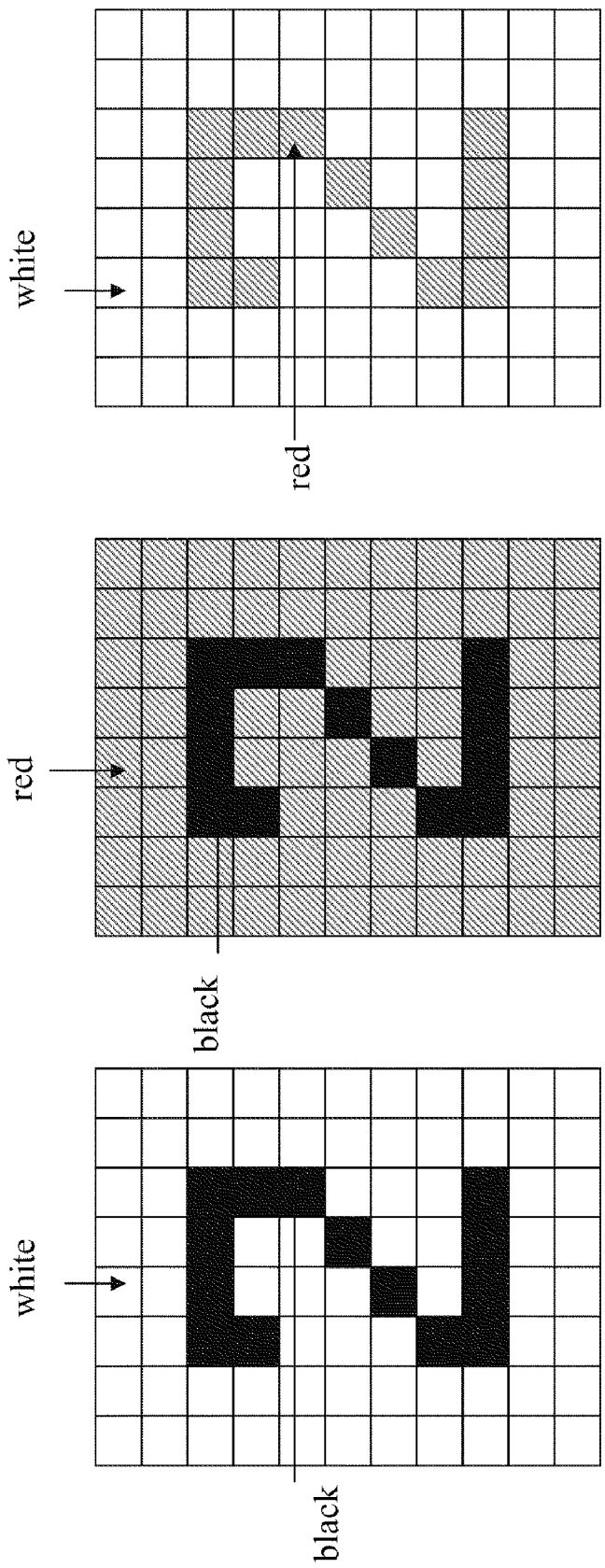
FIGS. 12a-12c illustrate the highlight options.

FIGS. 12a-12c show highlight options of the present invention. FIG. 12a shows a black image on a white background. In FIG. 12b, the black image is highlighted by the surrounding red color. In FIG. 12c, the image is highlighted by being switched to the red color.

In a further embodiment, microcups are filled with display fluids of different colors. However the pigment particles in the display fluids of different colors are still white and black particles of opposite polarities. In this case, the display may display images of multiple colors (e.g., black, white, red, green and blue). The two pixel electrodes and the microcup must be aligned. Each pair of the pixel electrodes (or each microcup since they are aligned) is a sub-pixel. By utilizing different colors of sub-pixels, a full color display can be achieved. For example, if the three sub-pixels which make up a pixel are colored red, green and blue, full color images may be obtained by appropriately combining the three colors to make a color pixel. For these designs, as stated, the pixel electrodes must be aligned with the microcups.

However in a striped arrangement, that is, the microcups of the same color (i.e., the microcups are filled with a display fluid of the same color) are lined up contiguously in a row which extends across a display device, the pixel electrodes for those microcups do not have to be aligned with the microcups in the direction of the row.

The color displays of the present invention can be manufactured by various methods currently available, for example, the methods described in U.S. Pat. No. 6,930,818.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device comprising:
   a) a plurality of display cells filled with a display fluid comprising black and white pigment particles dispersed in a colored solvent, wherein the color of the solvent is the same for all of the display cells and the black and white pigment particles carry opposite charge polarities;
   b) a first layer comprising a single common electrode; and
   c) a second layer comprising a plurality of pairs of pixel electrodes, wherein each of the display cells is sandwiched between the common electrode and a pair of the pixel electrodes and said pair of the pixel electrodes defines a pixel.

2. The display device of claim 1, wherein the pairs of pixel electrodes are aligned with the display cells.

3. The display device of claim 1, wherein the two pixel electrodes in the pair are of substantially the same size.

4. The display device of claim 1, wherein one of the two pixel electrodes in the pair is an irregular shaped pixel electrode.

5. The display device of claim 1, wherein both pixel electrodes in the pair are irregular-shaped pixel electrodes.

6. The display device of claim 1, wherein the first layer is on a viewing side.

7. The display device of claim 1, wherein the second layer is on a viewing side.

8. The display device of claim 1, wherein the pixel electrodes are active matrix driving electrodes.

9. The display device of claim 1, wherein the two pixel electrodes in the pair are of different sizes.

10. The display device of claim 9, wherein the ratio of the sizes of the two pixel electrodes ranges from 10:1 to 2:1.

11. A display device comprising:
    a) a plurality of display cells filled with display fluids of different colors, wherein said display fluids comprise black and white pigment particles dispersed in solvents of different colors and the black and white pigment particles carry opposite charge polarities;
    b) a first layer comprising a single common electrode; and
    c) a second layer comprising a plurality of pairs of pixel electrodes, wherein each of the display cells is sandwiched between the common electrode and a pair of the pixel electrodes and said pair of the pixel electrodes defines a sub-pixel and is aligned with the display cell.

12. The display device of claim 11, wherein the two pixel electrodes in the pair are of substantially the same size.

13. The display device of claim 11, wherein one of the two pixel electrodes in the pair is an irregular-shaped pixel electrode.

14. The display device of claim 11, wherein both pixel electrodes in the pair are irregular-shaped pixel electrodes.

15. The display device of claim 11, wherein the first layer is on a viewing side.

16. The display device of claim 11, wherein the second layer is on a viewing side.

17. The display device of claim 11, wherein the pixel electrodes are active matrix driving electrodes.

18. The display device of claim 11, wherein the two pixel electrodes in the pair are of different sizes.

19. The display device of claim 18, wherein the ratio of the sizes of the two pixel electrodes ranges from 10:1 to 2:1.

20. A display device comprising:
   a) a plurality of display cells filled with a display fluid comprising black and white pigment particles dispersed in a colored solvent, wherein the black and white pigment particles carry opposite charge polarities;
   b) a first layer comprising a single common electrode; and
   c) a second layer comprising a plurality of pairs of pixel electrodes, wherein the pairs of the pixel electrodes are not aligned with the display cells.

21. The display device according to claim 20, wherein the colored solvent have the same color in all the display cells.

22. The display device according to claim 20, wherein the colored solvent have the same color in a row of the display cells.

* * * * *